US012500529B2

(12) United States Patent
Jouzdani et al.

(10) Patent No.: US 12,500,529 B2
(45) Date of Patent: Dec. 16, 2025

(54) MODULATION METHODS AND CONTROLLERS FOR NEUTRAL POINT CLAMPED CONVERTER

(71) Applicant: Queen's University at Kingston, Kingston (CA)

(72) Inventors: Javad Ebrahimi Jouzdani, Kingston (CA); Alireza Bakhshai, Kingston (CA); Hamidreza Karshenas, Isfahan (IR)

(73) Assignee: Queen's University at Kingston, Kingston (CA)

( * ) Notice: Subject to any disclaimer, the term of this patent is extended or adjusted under 35 U.S.C. 154(b) by 345 days.

(21) Appl. No.: 18/220,476

(22) Filed: Jul. 11, 2023

(65) Prior Publication Data
US 2024/0079968 A1 Mar. 7, 2024

Related U.S. Application Data

(60) Provisional application No. 63/388,265, filed on Jul. 12, 2022.

(51) Int. Cl.
*H02M 7/483* (2007.01)
*H02M 7/487* (2007.01)

(52) U.S. Cl.
CPC .................. *H02M 7/487* (2013.01)

(58) Field of Classification Search
CPC ......... H02M 7/487; H02M 7/483; H02M 7/42
See application file for complete search history.

(56) References Cited

U.S. PATENT DOCUMENTS

| 9,673,713 | B2 * | 6/2017 | Kovacic | H03K 17/567 |
| 9,755,549 | B2 * | 9/2017 | Lewis | H02M 7/53871 |
| 9,780,692 | B2 * | 10/2017 | Hasegawa | H02M 7/487 |
| 10,727,762 | B2 * | 7/2020 | Aeloiza | H02M 1/08 |
| 2025/0183814 | A1 * | 6/2025 | Kojima | H02M 7/487 |

OTHER PUBLICATIONS

Bruckner, T., et al., "Loss balancing in three-level voltage source inverters applying active NPC switches," in Proc. IEEE Power Electron. Spec. Conf., Jun. 2001, pp. 1135-1140.

(Continued)

*Primary Examiner* — Adolf D Berhane
(74) *Attorney, Agent, or Firm* — Stephen J. Scribner

(57) ABSTRACT

A method for controlling a three phase neutral point clamped (NPC) converter independently controls switching devices of each phase to produce a reconstructed output voltage level of each phase based on a linear combination of three voltage levels of that phase. The method includes setting duty ratios of the switching devices of each phase to provide the reconstructed voltage level of each phase during a switching cycle, wherein the three voltage levels of each phase are 0, $$\frac{Vdc}{2},$$

and Vdc, where Vdc is the NPC converter input voltage. Controllers for three phase NPC converters produce drive signals for the switching devices according to the methods.

17 Claims, 13 Drawing Sheets

(56) References Cited

OTHER PUBLICATIONS

Ma, K., et al., "Operating and loading conditions of a three-level neutral-point-clamped wind power converter under various grid faults," IEEE Trans. Ind. Appl., vol. 48, No. 2, pp. 708-719, Mar./Apr. 2012.
Bruckner, T., et al., "The active NPC converter and its loss-balancing control," IEEE Trans. Ind. Electron., vol. 52, No. 3, pp. 855-868, Jun. 2005.
Bruckner, T., et al., "Optimal pulse-width modulation for three-level inverters," IEEE Trans. Power Electron., vol. 20, No. 1, pp. 82-89, Jan. 2005.
Deng, Y., et al. "Improved Modulation Scheme for Loss Balancing of Three-Level Active NPC Converters," IEEE Transactions on Power Electronics, vol. 32, No. 4, pp. 2521-2532, Apr. 2017.
Bhattacharya, S., et al., "Space-Vector-Based Generalized Discontinuous Pulse width Modulation for Three-Level inverters Operating at Lower Modulation Indices," IEEE J. Emerging Sel. Topic Power Electron., vol. 5, No. 2, pp. 912-924, Jun. 2017.
Ma, K., et al., "Modulation methods for neutral-point-clamped wind power converter achieving loss and thermal redistribution under low-voltage ride-through," IEEE Trans. Ind. Electron., vol. 61, No. 2, pp. 835-845, Feb. 2014.
Ma, K., et al., "Modulation Methods for Three-Level Neutral-Point-Clamped Inverter Achieving Stress Redistribution Under Moderate Modulation index," IEEE Trans. Ind. Electron., vol. 31, No. 1, pp. 5-9, Jan. 2016.

\* cited by examiner

MODULATION METHODS AND CONTROLLERS FOR NEUTRAL POINT CLAMPED CONVERTER

RELATED APPLICATION

This application claims the benefit of the filing date of Application No. 63/388,265, filed on Jul. 12, 2022, the contents of which are incorporated herein by reference in their entirety.

FIELD

The invention relates to three phase neutral point clamped power converters. More particularly, the invention relates to control methods and controllers that balance power losses and capacitor currents by controlling switching devices of neutral point clamped converters.

BACKGROUND

The three-level neutral point clamped (NPC) converter has attracted wide attention, especially in high-power medium voltage applications [1] [2]. One important market for the NPC converter is the application in wind energy conversion systems [3] [4]. Wind turbine power ratings may be as large as 8 MW [5]. This power rating is challenging for two-level converter technology due to the voltage and current limits of switching power devices. NPC converters reduce the voltage stress on the power devices, however, there is unequal power loss distribution among the semiconductors, which is a major issue in these converters [6] [7]. Unbalanced power losses cause unequal thermal stress on the semiconductors. The most stressed devices then determine the limit in power rating and lifetime of the converter. Equalizing the thermal stress on semiconductors, therefore, increases the lifetime and the power conversion capability of the converter. In wind energy conversion systems, the converters are frequently operated at frequencies much lower than the fundamental frequency. This further increases power loss and exacerbates junction temperature imbalance [8]. A direct consequence of operating the converter at a frequency lower than the synchronous frequency is that the most stressed power devices are continuously heated up for longer periods. This causes increased junction temperature ripples and reduced lifetime of the converter.

As a solution to the loss imbalance problem in the NPC converter, the Active NPC (ANPC) converter was introduced. In this topology the clamp diodes in the NPC converter are replaced with active/controllable power devices, thus offering more flexibility for loss balancing control. Pulse width modulation (PWM) methods [9]-[10] have been proposed to manage the power loss distribution in ANPC converters. However, they do not fully address the problem.

SUMMARY

One aspect of the invention relates to a three phase NPC converter modulation scheme that overcomes the problem of unequal loss among switches in each leg of the converter. Embodiments reduce RMS current of dc link capacitors which allows for small capacitor size.

Another aspect of the invention relates to a method for controlling a three phase NPC converter, comprising: for first, second, and third phases of the NPC converter, independently controlling switching devices of each phase to produce a reconstructed output voltage level of each phase based on a linear combination of three voltage levels of that phase; setting duty ratios of the switching devices of each phase to provide the reconstructed voltage level of each phase during a switching cycle; wherein the three voltage levels of each phase are 0, $$\frac{Vdc}{2},$$

and Vdc, where Vdc is an NPC converter input voltage.

One embodiment comprises arranging the duty ratios of the switching devices of the first, second, and third phases in the switching cycle to optimize a switching frequency of the NPC converter.

In one embodiment, a neutral point current is minimized over one switching cycle.

In one embodiment, setting duty ratios comprises selecting switching states corresponding to the duty ratios associated with each space vector for each phase; wherein a switching frequency of the NPC converter is minimized.

One embodiment comprises balancing DC-link capacitor voltage by arranging the duty ratios of different switching states in one switching cycle such that capacitor voltage drift is compensated; wherein volt-second balance is maintained in each phase; and a sum of duty ratios in each phase is equal to 1.

Another aspect of the invention relates to a controller for a three phase NPC converter, comprising: a circuit that produces drive signals for power switching devices of first, second, and third phases of the NPC converter; wherein the drive signals independently control the switching devices of each phase to produce a reconstructed output voltage level of each phase based on a linear combination of three voltage levels of that phase; wherein the drive signals set duty ratios of the switching devices of each phase to provide the reconstructed voltage level of each phase during a switching cycle; wherein the three voltage levels of each phase are 0, Vdc/2, and Vdc, where Vdc is an NPC converter input voltage.

In one embodiment, the drive signals arrange the duty ratios of the switching devices of the first, second, and third phases in the switching cycle to optimize a switching frequency of the NPC converter.

In one embodiment, the drive signals control the power switching devices to minimize a neutral point current over one switching cycle.

In one embodiment, the drive signals arrange the duty ratios by selecting switching states corresponding to the duty ratios associated with each space vector for each phase; wherein a switching frequency of the NPC converter is minimized.

In one embodiment, the drive signals balance DC-link capacitor voltage by arranging the duty ratios of different switching states in one switching cycle such that capacitor voltage drift is compensated; wherein volt-second balance is maintained in each phase; and a sum of duty ratios in each phase is equal to 1.

Another aspect of the invention relates to a three phase NPC converter comprising a controller as described herein.

Another aspect of the invention relates to a non-transitory computer readable media for use with a processor, the computer readable media having stored thereon instructions that when executed by the processor of a controller for a three phase NPC converter, cause the controller to perform a modulation method, comprising: for first, second, and third phases of the NPC converter, independently controlling switching devices of each phase to produce a reconstructed output voltage level of each phase based on a linear combination of three voltage levels of that phase; setting duty ratios of the switching devices of each phase to provide the reconstructed voltage level of each phase during a switching cycle; wherein the three voltage levels of each phase are 0, Vdc/2, and Vdc, where Vdc is an NPC converter input voltage.

In one embodiment of the non-transitory computer readable media, the modulation method further comprises arranging the duty ratios of the switching devices of the first, second, and third phases in the switching cycle to optimize a switching frequency of the NPC converter.

In one embodiment of the non-transitory computer readable media, a neutral point current is minimized over one switching cycle.

In one embodiment of the non-transitory computer readable media, setting duty ratios comprises selecting switching states corresponding to the duty ratios associated with each space vector for each phase; wherein a switching frequency of the NPC converter is minimized.

In one embodiment of the non-transitory computer readable media, the modulation method further comprises balancing DC-link capacitor voltage by arranging the duty ratios of different switching states in one switching cycle such that capacitor voltage drift is compensated; wherein volt-second balance is maintained in each phase; and a sum of duty ratios in each phase is equal to 1.

BRIEF DESCRIPTION OF THE DRAWINGS

For a greater understanding of the invention, and to show more clearly how it may be carried into effect, embodiments will be described, by way of example, with reference to the accompanying drawings, wherein.

DETAILED DESCRIPTION OF EMBODIMENTS

Figure 1A:
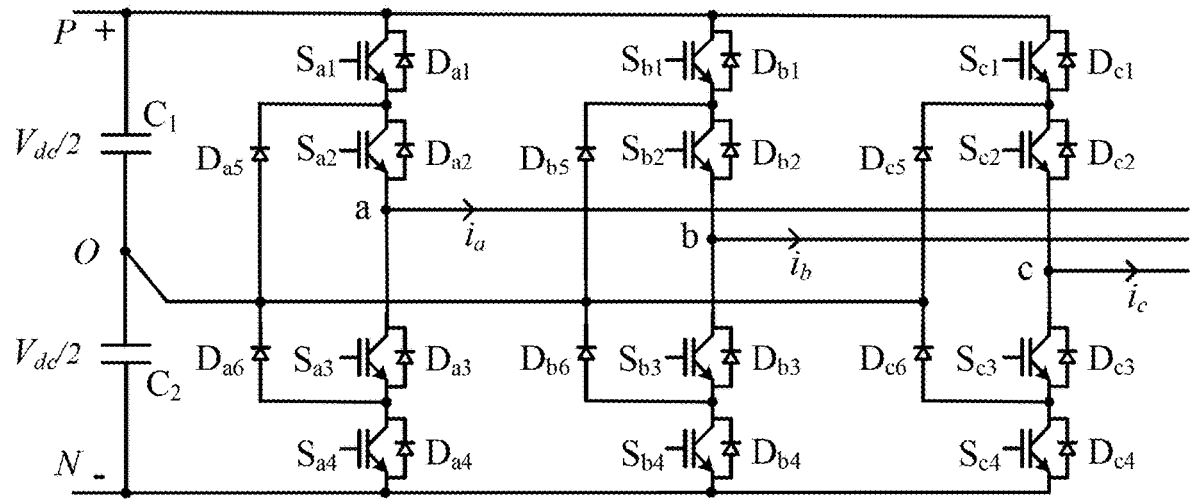
FIG. 1A is a circuit diagram of a conventional NPC inverter, according to the prior art.

Described herein are methods and controllers for modulating switching of power switching devices in NPC converters, such as that shown in FIG. 1A. FIG. 1A is a circuit diagram of a conventional NPC converter implemented with insulated gate bipolar transistors (IGBTs) as the power switching devices. In some embodiments the NPC converter may be implemented with other types of switching devices, such as MOSFETs. Referring to FIGS. 1A, P and N are the positive and negative dc input points, respectively, for receiving a dc input voltage $V_{dc}$, O is the neutral point, $C_{dc1}$ and $C_{dc2}$ are the dc link capacitors, which, according to the prior art, are typically very large electrolytic capacitors, and a, b, and c are the output points of the three phases. Each phase a, b, and c includes four series-connected power switching devices (e.g., $S_{a1}$-$S_{a4}$, shown with body diodes $D_{a1}$-$D_{a4}$) connected between the positive and negative dc input points, and two clamping diodes (e.g., $D_{a5}$-$D_{a6}$) connected across the second and third switches and the neutral point O.

Embodiments equally distribute loss among the power switching devices of NPC converters and substantially reduce or eliminate loss imbalance problems typically exhibited by prior approaches. Embodiments avoid the need for other approaches, such as complex ANPC topologies and complex switching schemes, as have been employed in prior attempts to address loss imbalance of NPC converters. For example, performance of embodiments as described herein implemented with basic NPC converters exceeds that of state-of-the-art modulation schemes implemented on advanced ANPC converters. Embodiments retain merits of NPC topology such as the dv/dt of output voltage and dynamic voltage sharing of the switches. Methods and controllers according to embodiments may be implemented in existing NPC converter topologies such as that shown in FIG. 1A, and existing controllers such as that shown in FIG. 1B, e.g., as a retrofit, thereby avoiding the need for expensive and time-consuming converter upgrades.

Embodiments are based, in one aspect, on reconstructing a voltage level of each phase by a linear combination of the other two other voltage levels of that phase. For example, the three voltage levels may be 0, $$\frac{Vdc}{2},$$

and Vdc, where Vdc is the NPC converter input voltage, or, more generally, the voltage levels may be represented as 0, 1, and 2. Reconstructing voltage levels this way results in lower neutral point current over one sampling period which reduces current ripple in dc link capacitors, which in turn reduces the size and cost of dc link capacitors, allowing smaller and less expensive capacitors to be used and increasing reliability. For example, compared to the conventional SVM modulation scheme, embodiments may allow for a reduction in size of dc-link capacitors by 40-70%. Implementation of embodiments with NPC converters provides attractive benefits, including, e.g., one or more of:

- Smaller dc link capacitor size due to the reduced rms current of capacitors and reduced voltage ripple;
- Active balancing of dc link capacitor voltage;
- Lower cost of voltage conversion systems due to utilization of simple NPC topology instead of ANPC topology;
- Significantly improved loss balancing of the main switching devices;
- Significantly improved thermal distribution of the main switching devices;
- Increased power rating and lifetime of NPC converters due to smaller junction temperature ripples of the switching devices and smaller dc link capacitors;
- Ability to operate in all ranges of modulation indexes and power factors;
- Retain the merits of NPC topology such as the dv/dt of output voltage and dynamic voltage sharing of the switches;
- In some embodiments, use of discontinuous Space Vector Modulation (SVM) to decrease switching losses and improve efficiency.

As noted above, embodiments may include a modulation scheme based on reconstructing the voltage level of each phase by a linear combination of other voltage levels of that phase. For example, if the level of a given phase is set to 1 by an appropriate modulation technique, this level can be reconstructed by a linear combination of three levels 0, 1 and 2. It is noted that the average of a reconstructed voltage level is equal to the corresponding actual voltage level, and therefore using the reconstructed voltage level instead of actual voltage level still satisfies the volt-second balance requirement. The volt-second balance is the relationship used in SVM schemes to determine duty ratios of the voltage space vectors. The relationship states that the average volt-second of the voltage space vectors over the sampling period should equal the reference voltage. However, an added feature of a reconstructed voltage level modulation scheme as described herein is that implementation results in lower neutral point current over one sampling period.

As used herein, the term "sampling period" refers to a modulation period of an NPC converter. A sampling period or modulation period is the period for one complete switching cycle of the converter.

In some embodiments, an additional control loop may be used to balance dc-link capacitor voltages. In such embodiments a feature is included whereby the capacitor voltage drift is compensated. As will be shown below, this results in a reduction in current ripple of the dc link capacitors. This may be achieved by rearranging the duty ratios of different switching states in one sampling period such that capacitor voltage drift is compensated, while meeting the volt-second balance requirements during one sampling period.

Embodiments may be implemented in a controller with power switching device gate drivers and logic circuitry in whole or in part using discrete (e.g., analogue) components and/or using digital technology. Embodiments may include integrated circuit (IC) implementation, which greatly reduces component cost and design complexity. Examples of suitable digital technologies include processors such as, but not limited to, digital signal processor (DSP), field programmable gate array (FPGA), application specific integrated circuit (ASIC), and microcontroller unit (MCU). For example, one or more components of a controller may be implemented in an algorithm using a suitable computer or hardware language (i.e., code) such as, for example, very high speed integrated circuit (VHSIC) hardware descriptive language (VHDL), register transfer language (RTL), or Verilog. Such an algorithm may be implemented in, for example, a DSP, FPGA, ASIC, or MCU device of a controller.

Figure 1B:
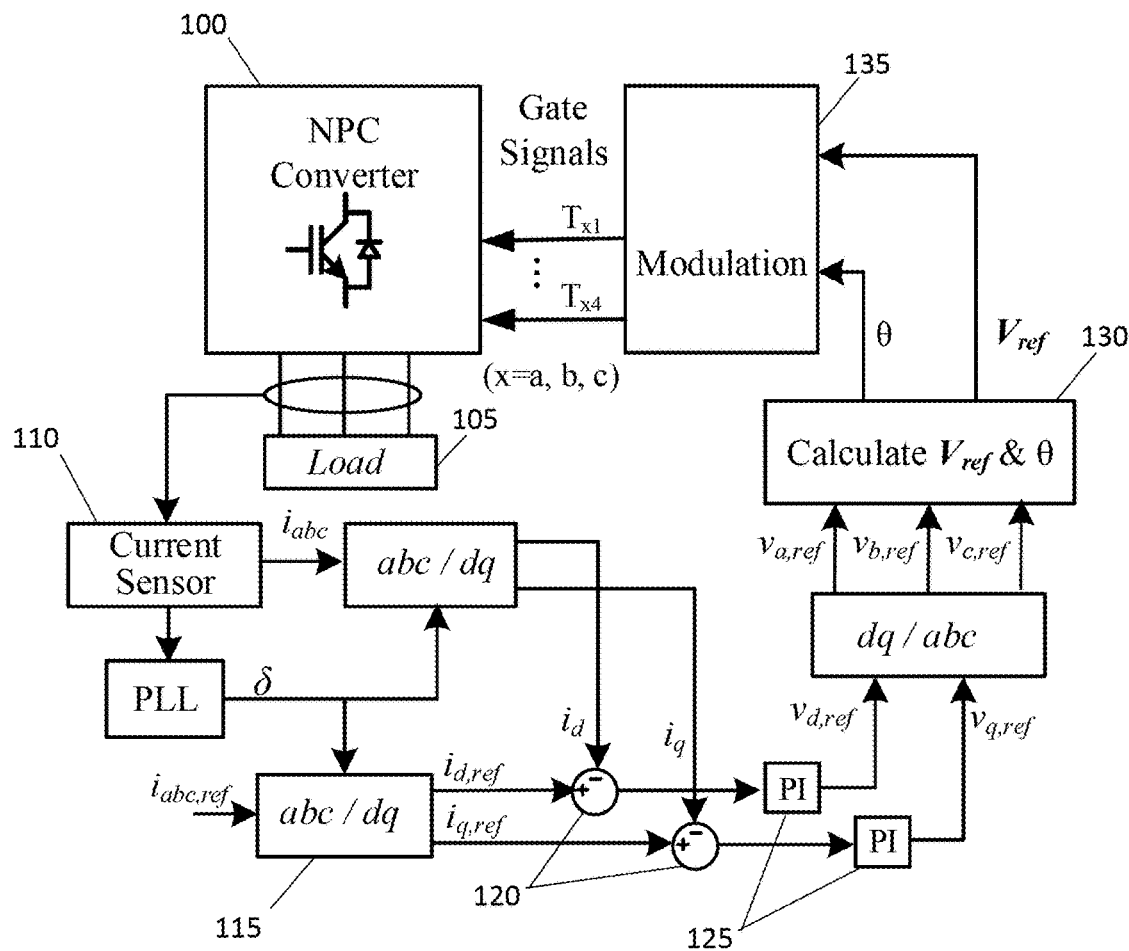
FIG. 1B is a generalized diagram of a current controller for a NPC inverter.

An example of a controller for an NPC converter is shown in FIG. 1B. Briefly, the controller senses the current delivered to a load 105 using a current sensor 110. The sensed current is compared to a reference current 115 to generate error signals at 120. The error signals are subjected to a proportional-integral (PI) function 125 to generate reference voltages. The reference voltages are used to calculate Vref and phase θ at 130, which are then used in a modulation scheme at 135 to generate the gate signals for the switches of the NPC converter 100. Such a controller may be based on a space vector modulation (SVM) scheme stored/processed at 135, as known in the prior art. However, such a controller may also be based on embodiments described herein by instead storing/processing a modulation scheme according to the embodiments at 135. Various components such as the storage/processing component 135 may be implemented in a digital technology as noted above. For example, the modulation method may include an algorithm stored as computer code in a nonvolatile memory device, such that the memory device may be replaced or updated (e.g., "flashed") with code for performing a modulation method according to embodiments described herein.

Another aspect of the invention relates to non-transitory computer readable media for use with a processor, the computer readable media having stored thereon instructions that, when executed by the processor of a controller for a NPC converter, cause the controller to perform a modulation method according to embodiments described herein.

General Approach

Figure 2:
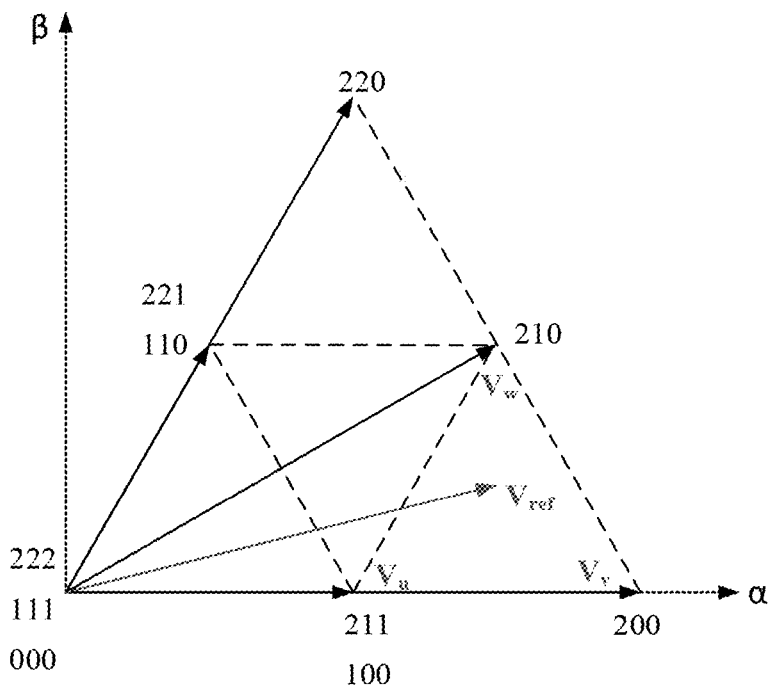
FIG. 2 is a space vector diagram for a conventional NPC inverter, according to the prior art.

FIG. 2 is a conventional space vector diagram of an NPC converter. Each sector in the space vector diagram has nine regions, as shown in FIG. 2. In each region, the reference vector is synthesized by three adjacent space vectors. These three vectors are termed as $V_u$, $V_v$, and $V_w$ and described in terms of corresponding phase voltage levels as $$V_u:(l_{au}l_{bu}l_{cu}) \equiv \left(V_{l_{au}}^{au} V_{l_{bu}}^{bu} V_{l_{cu}}^{cu}\right) \quad (1)$$

$$V_v:(l_{av}l_{bv}l_{cv}) \equiv \left(V_{l_{av}}^{av} V_{l_{bv}}^{bv} V_{l_{cv}}^{cv}\right)$$

$$V_w:(l_{aw}l_{bw}l_{cw}) \equiv \left(V_{l_{aw}}^{aw} V_{l_{bw}}^{bw} V_{l_{cw}}^{cw}\right)$$

where $l_{ps}$ (p=a, b, c and s=u, v, w) is the level of phase p corresponding to space vector s, and $V_{l_{ps}}^{ps}$ is the corresponding output voltage of level $l_{ps}$ relative to the negative rail N− (see FIG. 1A). Note that $$l_{ps} \in \{0 \ 1 \ 2\} \quad (2)$$

-continued $$V_{l_{ps}}^{ps} \in \left\{ 0 \quad \frac{V_{dc}}{2} \quad V_{dc} \right\}$$

The first step is to reconstruct a given phase voltage level using a combination of the other existing voltage levels. For example, if the level of phase p is set to 1 by an appropriate modulation technique, this level can be reconstructed by a linear combination of three levels 0, 1 and 2. Note that the average of the reconstructed voltage level 1 is equal to the actual voltage level 1, and therefore using the reconstructed voltage level 1 instead of the actual voltage level 1 still satisfies the volt-balance requirement. However, an added feature of using the reconstructed voltage level is that its implementation results in lower neutral point current over one sampling period.

Also, considering that no current passes through neutral point during levels 0 and 2, the reconstructed voltage levels 0 and 2 are the same as the original levels, i.e.

$$RV_0^{ps} = V_0^{ps}$$

$$RV_2^{ps} = V_2^{ps} \quad (3)$$

Using (3) and (4), proper phase voltage level reconstruction can be performed such that the following requirements are satisfied:
1) Volt-second balance in each phase is maintained, and
2) The sum of duty ratios of applied levels in each phase is equal to 1.

The next step is selecting the proper space vectors and their corresponding duty ratios in a Space Vector Modulation (SVM) technique such that the desired reconstructed phase voltage levels are achieved.

Assuming the conventional SVM method is applied, the basic volt-second balance relationship used to determine the duty ratios of space vectors may be written as $$V_{ref} = d_{V_u} \cdot V_u + d_{V_v} \cdot V_v + d_{V_w} \cdot V_w$$

$$0 \le d_{V_j} \le 1$$

$$d_{V_u} + d_{V_v} + d_{V_w} = 1 \quad (4)$$

where $d_{V_u}$, $d_{V_v}$, and $d_{V_w}$ are the duty ratios corresponding to three adjacent vectors $V_u$, $V_v$, and $V_w$, respectively. Considering FIG. 2, one may note that these duty ratios also show the duration of each level corresponding to selected space vectors. For example, if vector $V_{2,1}$:211 in FIG. 2 is selected for $V_u$, the duty ratios of level 2 in phase a, level 1 in phase b, and level 1 in phase c would also be $d_{V_u}$. Extending this concept to reconstructed levels and writing in generalized form yields $$d_{RV_{l_{as}}^{as}} = d_{RV_{l_{bs}}^{bs}} = d_{RV_{l_{cs}}^{cs}} = d_{V_s}, s = u, v, w \quad (5)$$

where, for example, $$d_{RV_{l_{as}}^{as}}$$

is the duty ratio corresponding to the reconstructed voltage level $1_{as}$.

Using (3) to (5), the duty ratios corresponding to voltage levels 0, 1 and 2 of phase p of space vector s may be calculated as $$d_{V_0^{ps}} = d_{RV_0^{ps}} + \frac{1}{3} d_{RV_1^{ps}} \quad (6)$$

$$d_{V_1^{ps}} = \frac{1}{3} d_{RV_1^{ps}}, p = a, b, c. \; \& \; s = u, v, w.$$

$$d_{V_2^{ps}} = d_{RV_2^{ps}} + \frac{1}{3} d_{RV_1^{ps}}$$

where $d_{V_0^{ps}}$, $d_{V_1^{ps}}$, and $d_{V_2^{ps}}$ are respectively the duty ratios corresponding to voltage level 0, 1, and 2 of phase p of space vector s.

The selection of the sequence of applying different switching states over one sampling period is an important step in any SVM technique as it affects the converter switching frequency and output voltage harmonic spectra. The first step in selecting switching sequence according to the methods herein is determining the intervals associated with each phase level during one sampling period. The duty ratios corresponding to these intervals are shown by $d_{V_l^p}$ where l is the associated level and p denotes the phase name. For example, $d_{V_0^a}$ illustrates the duty ratio in which phase a should stay in level 0 during the sampling period. These duty ratios may be calculated by knowing the duty ratios corresponding to given phase voltage level during the sampling period. The following equations may be used for the calculation of duty ratio associated with each phase level.

$$d_{V_0^p} = d_{V_0^{pu}} + d_{V_0^{pv}} + d_{V_0^{pw}} \quad (7)$$

$$d_{V_1^p} = d_{V_1^{pu}} + d_{V_1^{pv}} + d_{V_1^{pw}}, p = a, b, c.$$

$$d_{V_2^p} = d_{V_2^{pu}} + d_{V_2^{pv}} + d_{V_2^{pw}}$$

where $d_{V_0^p}$, $d_{V_1^p}$, and $d_{V_2^p}$ are respectively the duty ratios corresponding to voltage level 0, 1, and 2 of phase p during one sampling period.

Figure 3:
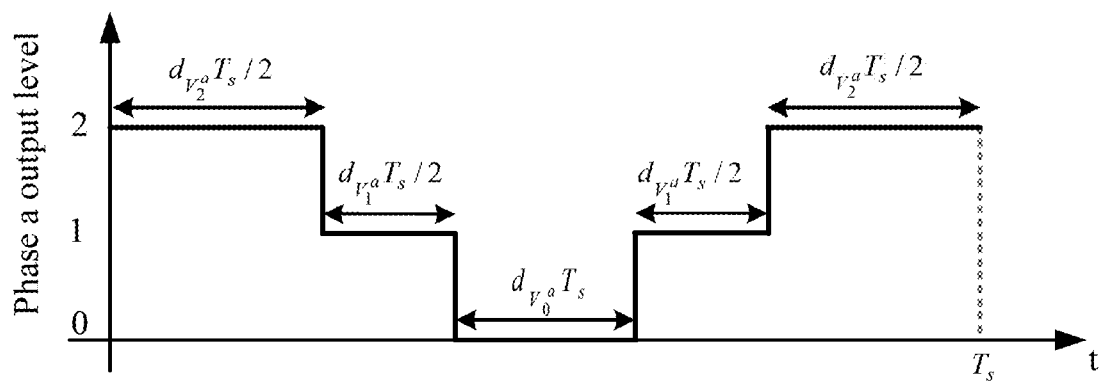
FIG. 3 is a plot showing typical output voltage levels of phase a in a sampling period of an NPC inverter, according to the prior art.

Once the duty ratios associated which each phase levels are determined, they must be properly arranged in one sampling period such that the switching frequency is minimized or other performance criteria are achieved. FIG. 3 shows a typical voltage level arrangement for different phases in one sampling period.

Discontinuous SVM

It can be seen from FIG. 2 that there is a redundancy associated with $V_u$, $V_v$, and $V_w$. For example, given the reference voltage is located in triangle $V_u$, $V_v$, and $V_w$ as shown in FIG. 2, the space vector $V_u$ has redundant switching states (211) and (100). Therefore, after selecting the duty ratio associated with each space vector, there are different combinations of switching states to apply to the converter in each sampling period. The selection of proper switching states is important in optimizing the switching frequency as described below.

In one embodiment the switching state associated with each space vector may be selected with the goal of minimizing switching frequency. Considering FIG. 2, if the first switching states of space vectors $V_u$, $V_v$, and $V_w$ are selected, the level of phase a would remain at 3 throughout this sector. It can be shown that if any other combination of switching states is applied in this sector, the phase levels would change in such a way that higher switching frequency results. Due to the symmetry, this rule exists and is applied to the other sectors of the space vector diagram as well.

Active Capacitor Voltage Balancing

In one embodiment, an additional control loop may be utilized to compensate any dc link capacitor voltage drift due to non-ideal converter characteristics. This may be achieved by rearranging the duty ratio of different switching states in one sampling period such that capacitor voltage drift is compensated. As shown below, this results in a reduction in current ripple of the dc link capacitors.

Any rearrangement must always meet the following requirements during one sampling period:
1) Volt-second balance in each phase is maintained;
2) The sum of duty ratios of applied levels in each phase is equal to 1; and
3) The duty ratios of the voltage levels 0, 1, and 2 are modified to balance the dc-link capacitor voltages.

Assuming no significant change in reference voltage during one sampling period, writing the volt-second balance for phase p (p=a, b, c) during one sampling period yields $$d_{V_0^p} \times V_0^p + d_{V_1^p} \times V_1^p + d_{V_2^p} \times V_2^p + d_{V_3^p} \times V_3^p = V_{ref}^p \quad (8)$$

$$d_{V_0^p} + d_{V_1^p} + d_{V_2^p} + d_{V_3^p} = 1 \quad (9)$$

where $V_{ref}^p$ is the amplitude of reference voltage in phase p. The normalized voltage deviation of dc-link capacitor $C_1$ may be presented as $$\Delta V_1 = \frac{V_{C1} - V_{dc}/2}{V_{dc}} \quad (10)$$

An index may be defined based on the voltage deviation of dc-link capacitor as:

$$\delta_p = \Delta V_1 \times \text{sign}(i_p) \quad (11)$$

The new duty ratios may be defined as $$d_{V_0^p,new} = d_{V_0^p} - k \times \delta_p/2$$

$$d_{V_1^p,new} = d_{V_1^p} - k \times \delta_p$$

$$d_{V_2^p,new} = d_{V_2^p} - k \times \delta_p/2 \quad (12)$$

where $d_{V_0^p,new}$, $d_{V_1^p,new}$, $d_{V_2^p,new}$ are the new duty ratios of level 0, 1, and 2, respectively. It can be seen that with these new duty ratios, the three necessary requirements stated above are satisfied. This modification results in lower voltage deviation of the dc-link capacitors.

The invention is further described by way of the following non-limiting Example.

EXAMPLE

An embodiment of a modulation scheme as described herein was tested and verified by simulation using PSIM™ software (Powersim Inc., Rockville, MD, USA). The parameters of the simulated system are listed in Table I and were chosen based on [5] to ease a comparison of the results with an ANPC structure. An NPC converter with conventional SVM technique was also simulated for comparison.

TABLE 1

Simulation system parameters.

| System Parameter | Value |
| --- | --- |
| DC source voltage ($V_{dc}$) | 1070 V |
| Output frequency ($f_o$) | 50 Hz |
| Modulation index (M) | 0.8 |
| Sampling frequency ($f_s$) | 2 kHz |
| Load (R-L) | R = 1.76 Ω |
|  | L = 4.2 mH |
| Load power factor | 0.8 |
| Switches | Semikron SKM200GB125D, 1200 V, 160 A |

Input and Output Waveforms

In the first step of the simulation, all switches were assumed to be ideal in order to evaluate the functionality and voltage balancing of the modulation scheme embodiment.

Figure 4A:
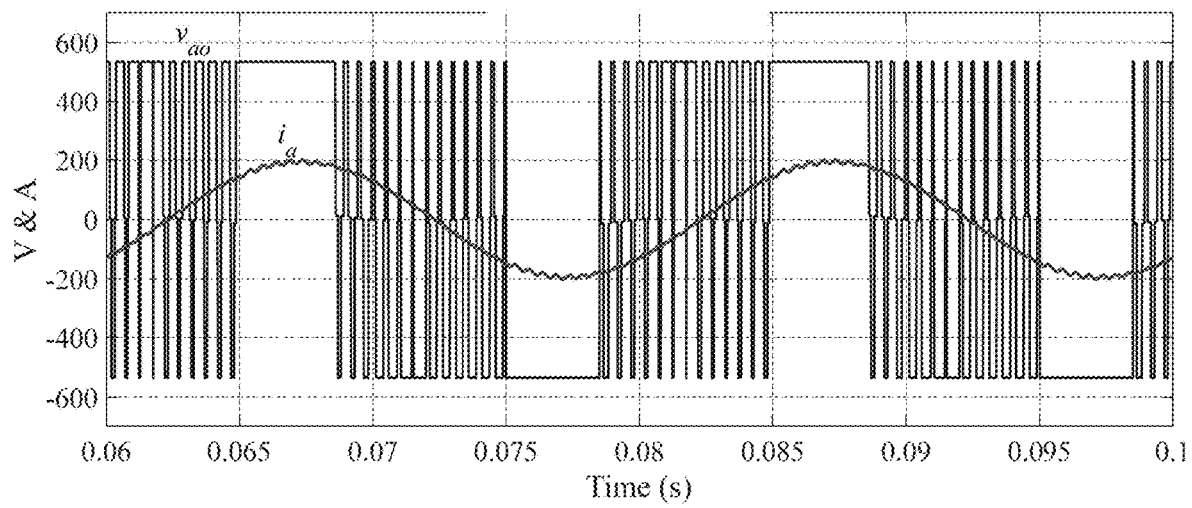
FIGS. 4A and 4B are plots showing simulation results for phase a voltage ($v_{an}$ in FIG. 1A) and current for an embodiment and a classic Space Vector Modulation (SVM) technique, respectively.
Figure 4B:
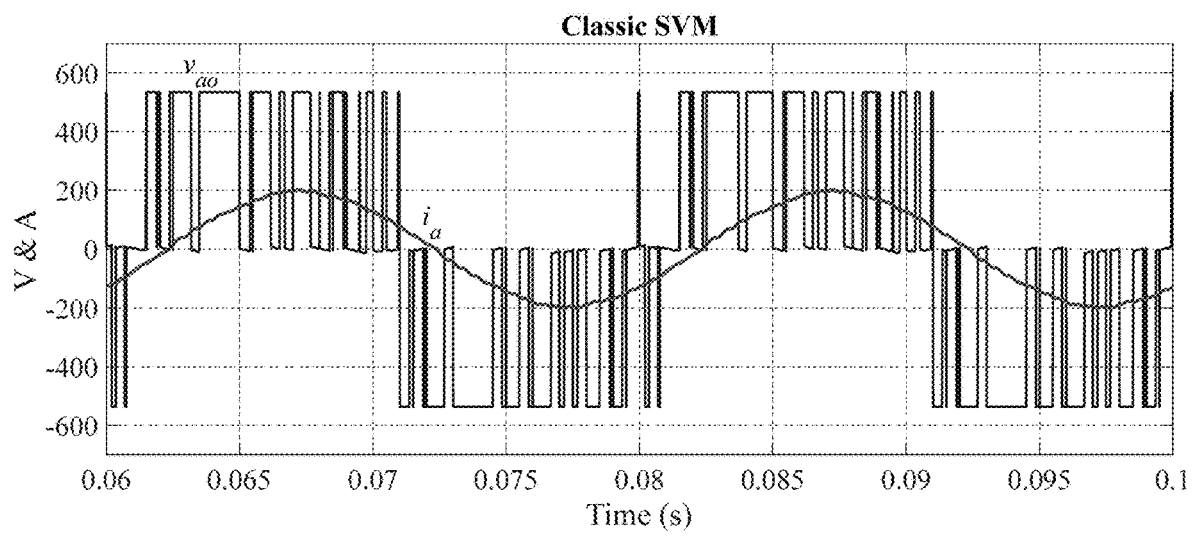
Figure 4C:
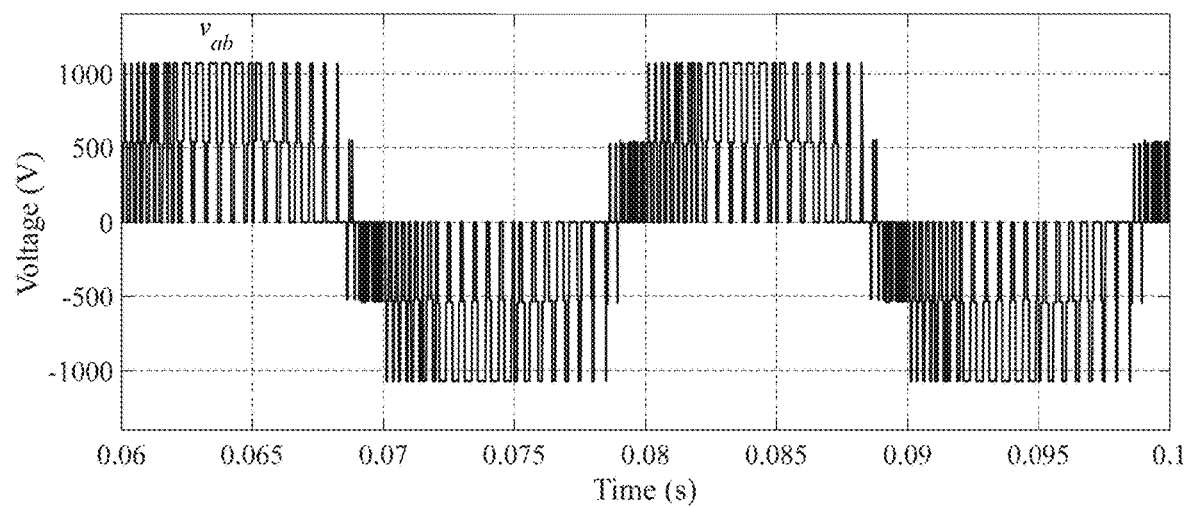
FIGS. 4C and 4D are plots showing simulation results for line to line voltage ($v_{ab}$) for an embodiment and a classic SVM technique, respectively.
Figure 4D:
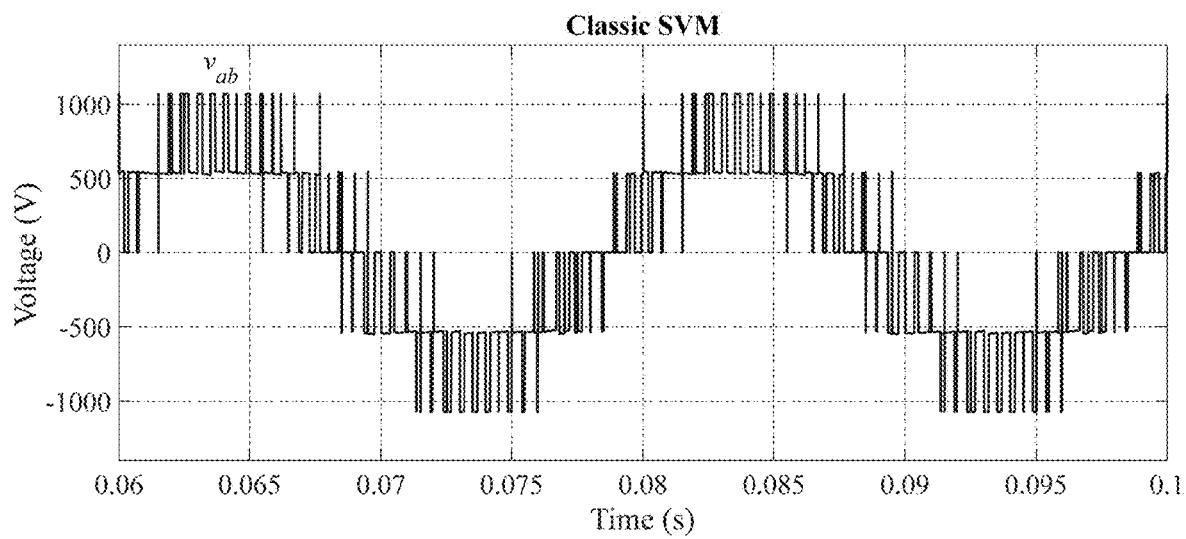
Figure 4E:
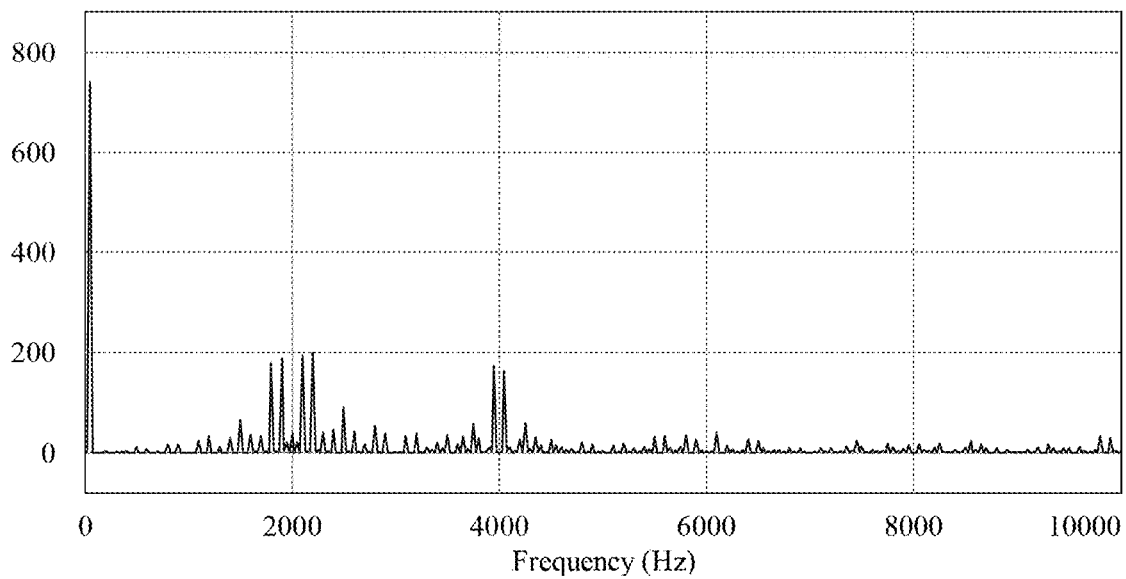
FIGS. 4E and 4F are plots showing simulation results for frequency spectra of the line to line voltage waveform for an embodiment and a classic SVM technique, respectively.
Figure 4F:
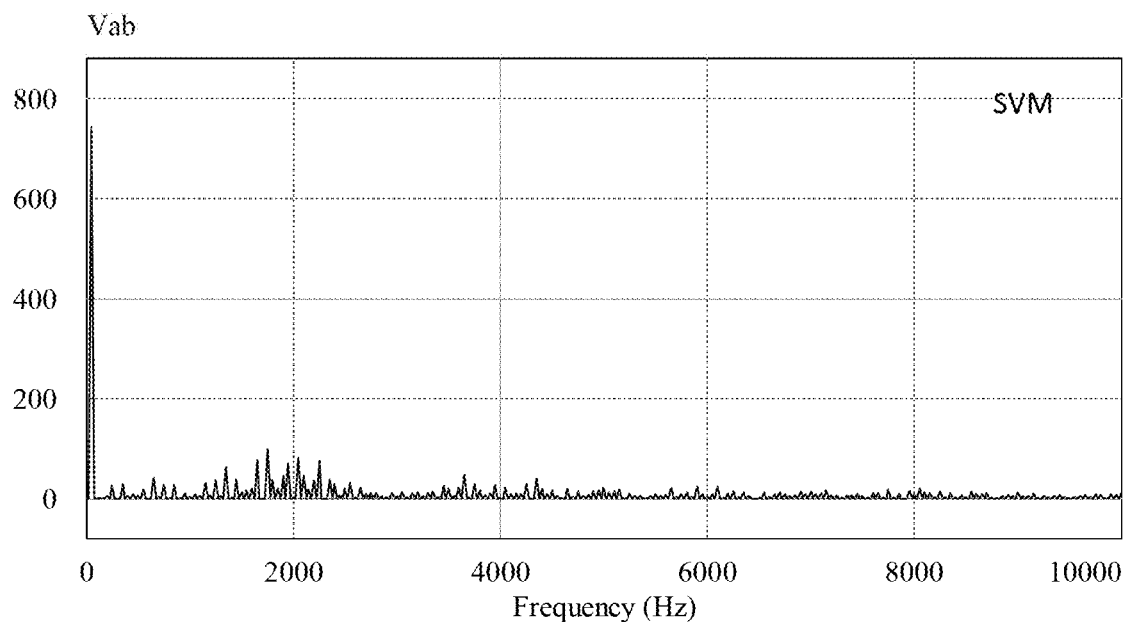

Performance comparisons between the embodiment and the classic SVM converter, respectively, are shown for the phase voltage ($v_{an}$ in FIG. 1A) and current relative to the neutral point (FIGS. 4A and 4B), the line to line voltage ($v_{ab}$) (FIGS. 4C and 4D) and the line voltage harmonic spectra (FIGS. 4E and 4F). A close inspection of the waveforms for the embodiment shows that the basic feature of the classic NPC modulation scheme is retained, i.e., all transitions are from the positive/negative voltage bus to the neutral point which makes the output voltage step equal to $V_{dc}/2$ during the entire output cycle. Consequently, the inherent dynamic voltage sharing also remains intact.

Figure 4G:
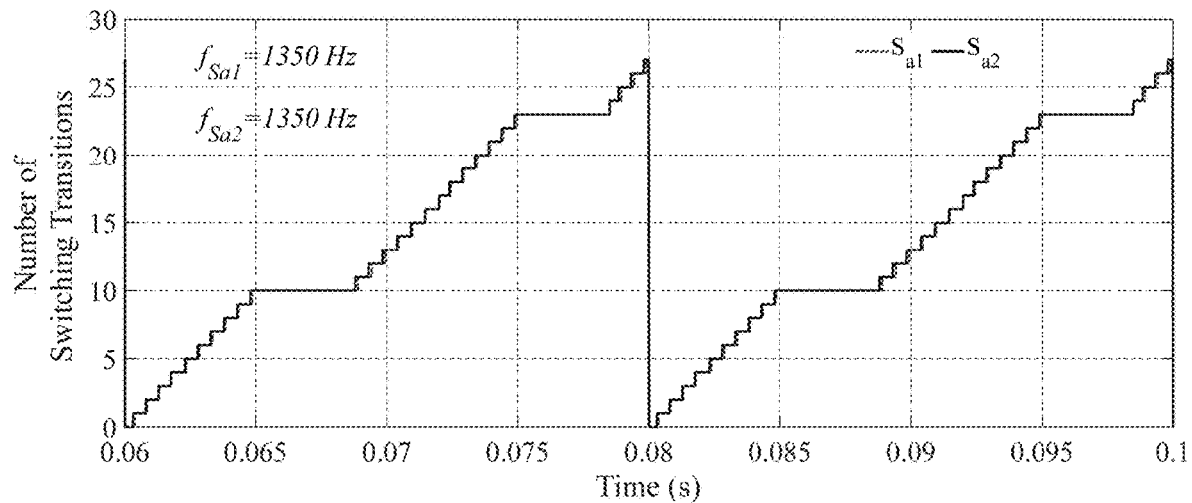
FIGS. 4G and 4H are plots showing simulation results for a number of switching transitions for an embodiment and a classic SVM technique, respectively.
Figure 4H:
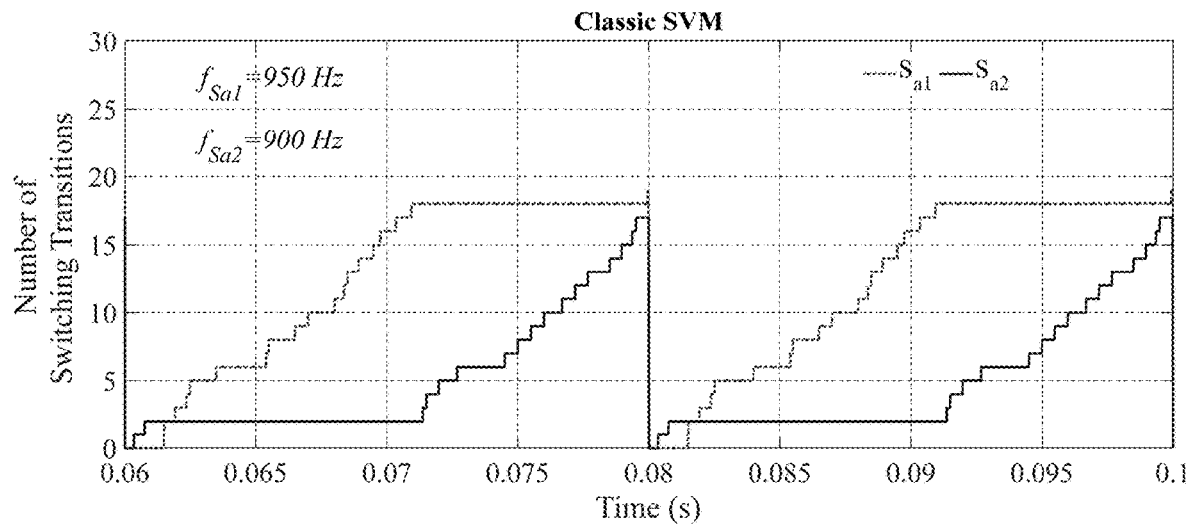

Also shown for the embodiment and the classic SVM converter, respectively, in FIGS. 4G and 4H, is the number of switching transitions in phase a, demonstrating that the switching behavior of the inner and outer switches is the same for the embodiment (the two traces are substantially superimposed). This confirms that the embodiment provides better switching loss balance, especially when the switching losses are dominant.

On the other hand, it is observed from FIGS. 4G and 4H that the switching frequency is increased in the embodiment. Despite that, using a proper implementation of discontinuous SVM (DSVM) can decrease the switching losses.

Figure 5A:
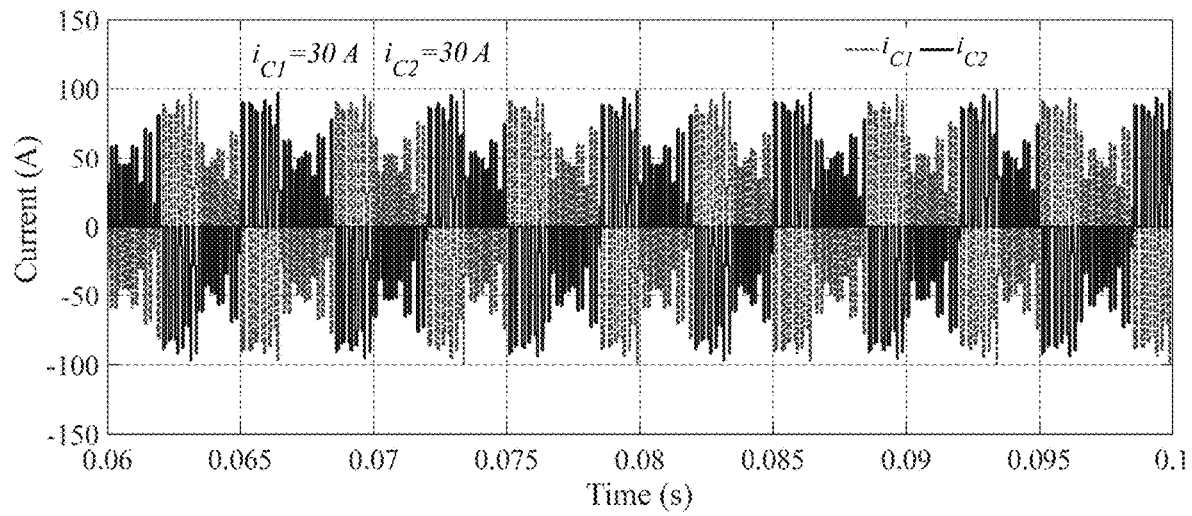
FIGS. 5A and 5B are plots of DC-link capacitor current for an embodiment and for a classic SVM technique, respectively.
Figure 5B:
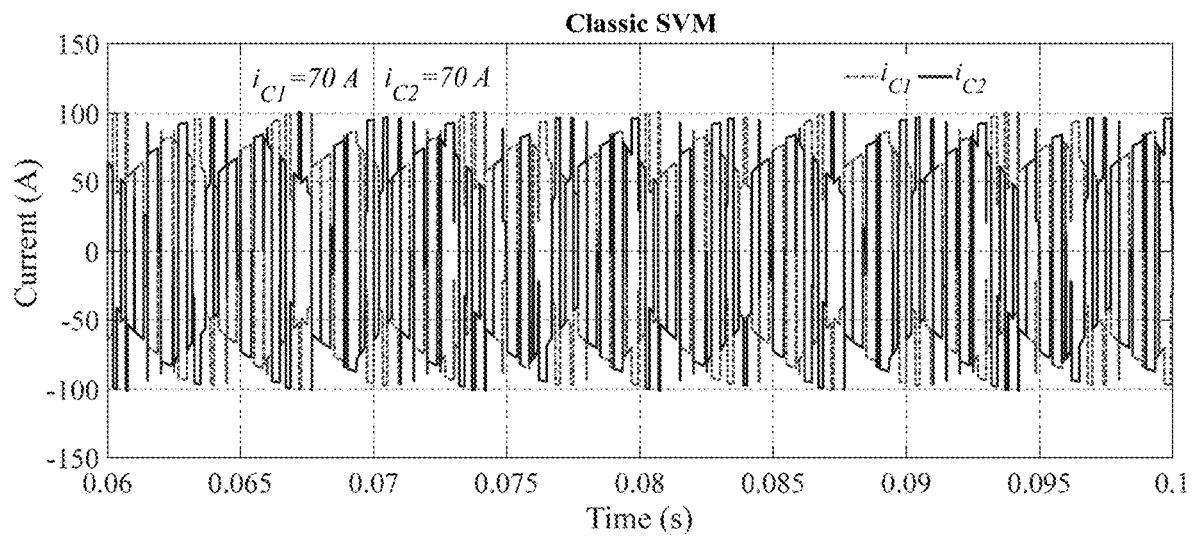

FIGS. 5A and 5B show the dc link capacitors current waveforms together with their RMS values for the embodiment and the conventional SVM scheme, respectively. It can be seen that the RMS current of dc link capacitors is significantly reduced in the embodiment (30 A compared to 70 A in the conventional SVM scheme). This allows for a substantial reduction in the size of the dc link capacitors in the embodiment. For example, in the embodiment the dc link capacitors may be rated at 1000 V, 560 µF, whereas using the SVM scheme 1000 V, 1000 µF capacitors are needed. This represents a reduction in dc link capacitor size of 44%, and optimization, e.g., for specific applications, may allow for a further reduction in size, for example, up to 70%.

Figure 6A:
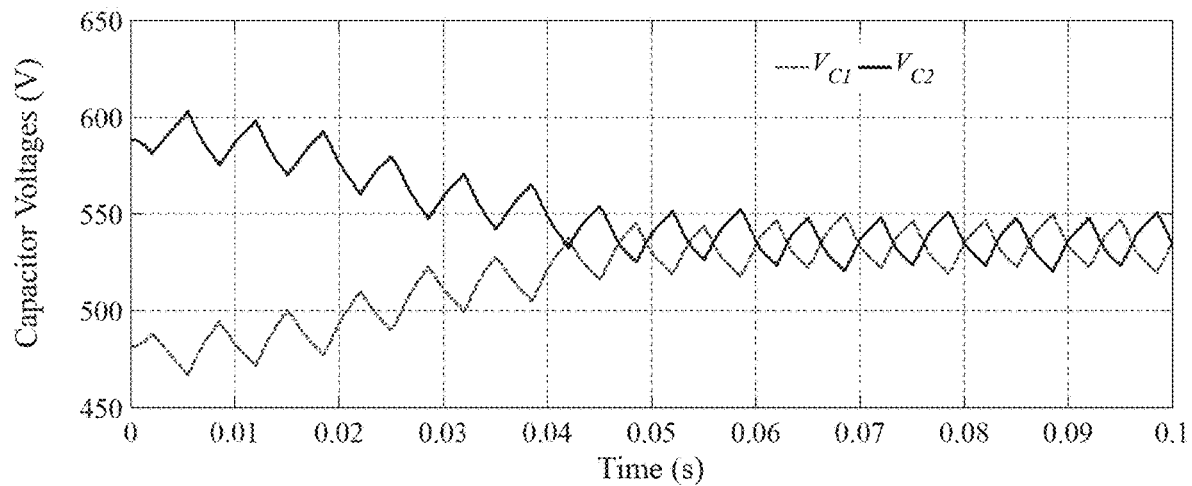
FIGS. 6A and 6B are plots showing simulation results of dc-link capacitor voltages for an embodiment when active voltage balancing is applied, and for a classic SVM technique, respectively.
Figure 6B:
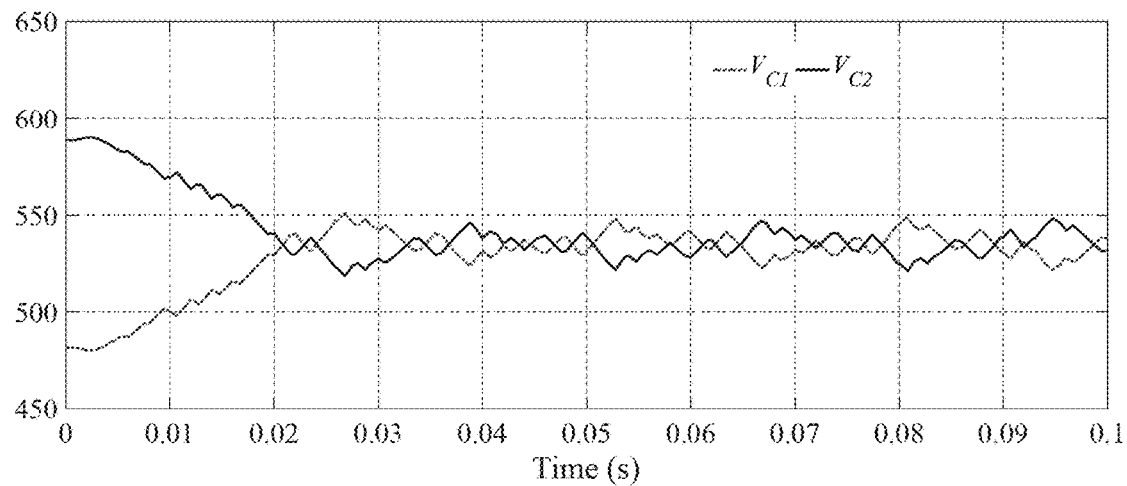
Figure 6C:
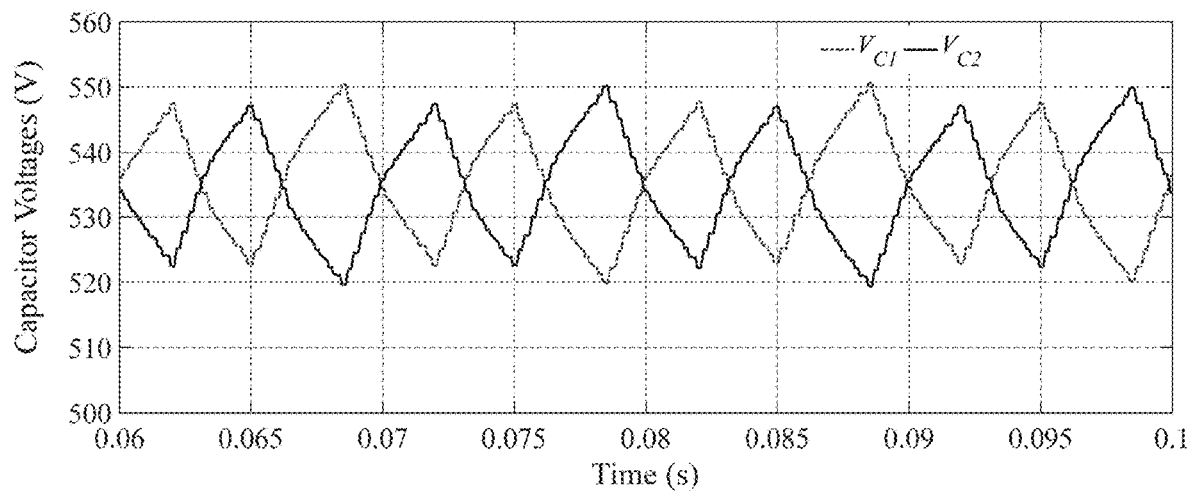
FIGS. 6C and 6D are plots showing simulation results of steady-state dc-link capacitor voltages for an embodiment when active voltage balancing is applied, and for a classic SVM technique, respectively.
Figure 6D:
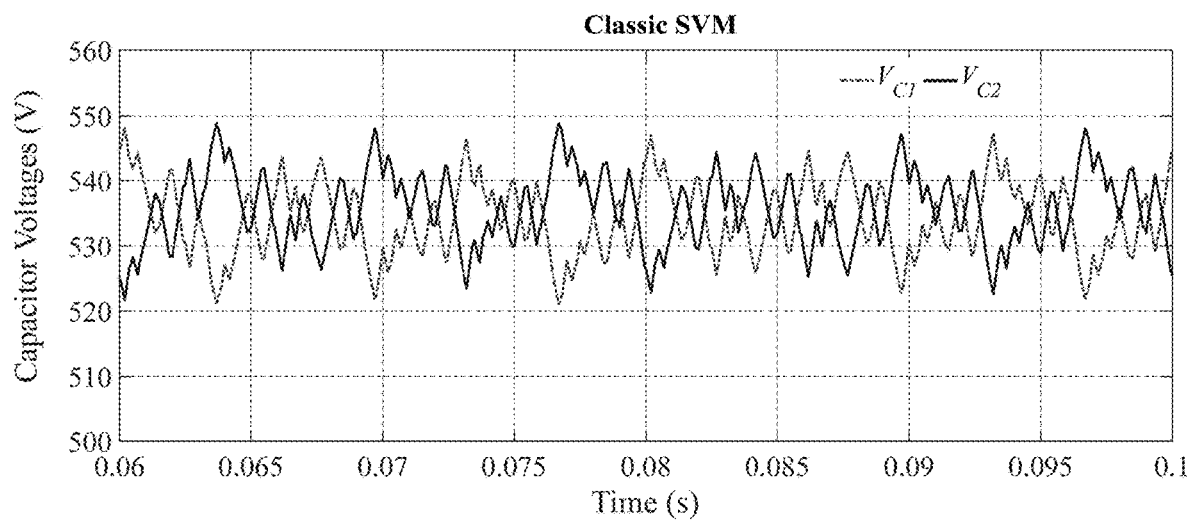

FIGS. 6A and 6B show the dc link capacitor voltages for the embodiment and the conventional SVM converter, respectively, when voltage balancing control is activated. FIGS. 6C and 6D show the steady state dc link capacitor voltages regulated to their nominal values, for the embodiment and the conventional SVM converter, respectively.

It is noted that unlike prior modulation techniques (e.g., [7], [8]) which are applicable only to a limited range of modulation index and/or power factor, a modulation scheme based on the embodiments described herein may be applied to the entire range of modulation indices and power factors. In fact, the performance of the embodiment in balancing the losses of the switches in low and moderate modulation indices (e.g., M=0.1-0.6) is better than that of the methods presented in [7] and [8].

Loss Analysis

Using a more realistic switch model in the PSIM simulation, a loss calculation associated with each modulation scheme was carried out. Although the PSIM switch model is not the most accurate model, it can provide a good estimation for comparison between different modulation schemes.

Figure 7A:
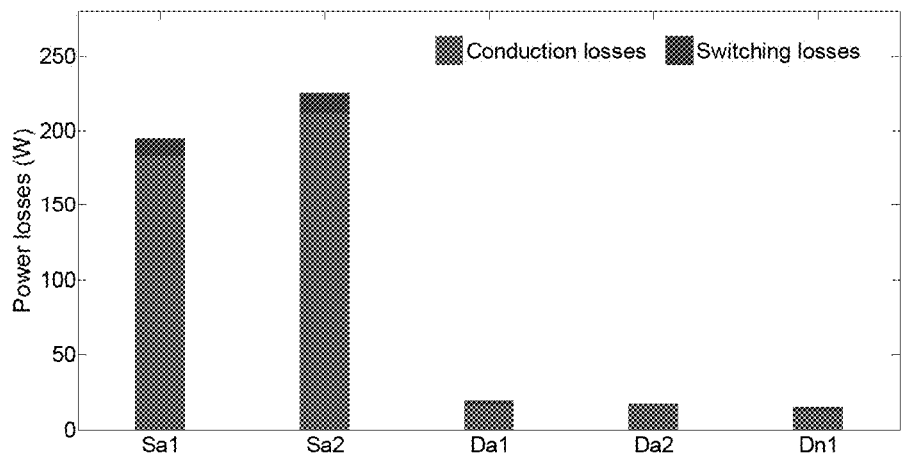
FIGS. 7A, 7B, and 7C are plots showing power losses of switching devices for an embodiment, for a conventional SVM technique, and an ANPC converter, respectively, based on a simulation.
Figure 7B:
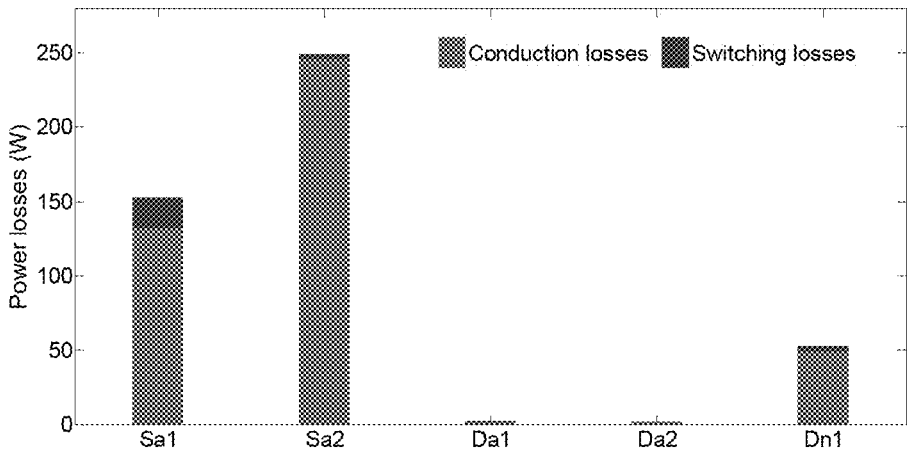

The switching devices used for the embodiment and the conventional SVM technique in this example were SKM200GB125D from Semikron Inc., rated at 1200 V and 160 A. Tables 2 and 3 present the average power losses for the switching devices for two modulation schemes. Only half of the power devices in each phase were considered (e.g., the upper switches $S_{a1}$ and $S_{a2}$ of phase a) since the two arms of each phase are symmetrical. FIGS. 7A and 7B show the loss distribution for the embodiment and the conventional SVM converter, respectively. It can be seen that there is about 12% difference between losses of the main switches $S_{a1}$ and $S_{a2}$ using the embodiment modulation scheme, while the difference between losses of the main switches $S_{a1}$ and $S_{a2}$ is more than 60% in the conventional SVM scheme, confirming the significant loss balancing of the embodiment.

Tables 2 and 3 also shown that the overall efficiency of the embodiment and the conventional SVM technique is similar, indicating that significant improvements in loss balancing is achieved by the embodiment without comprising efficiency of the converter.

Figure 7C:
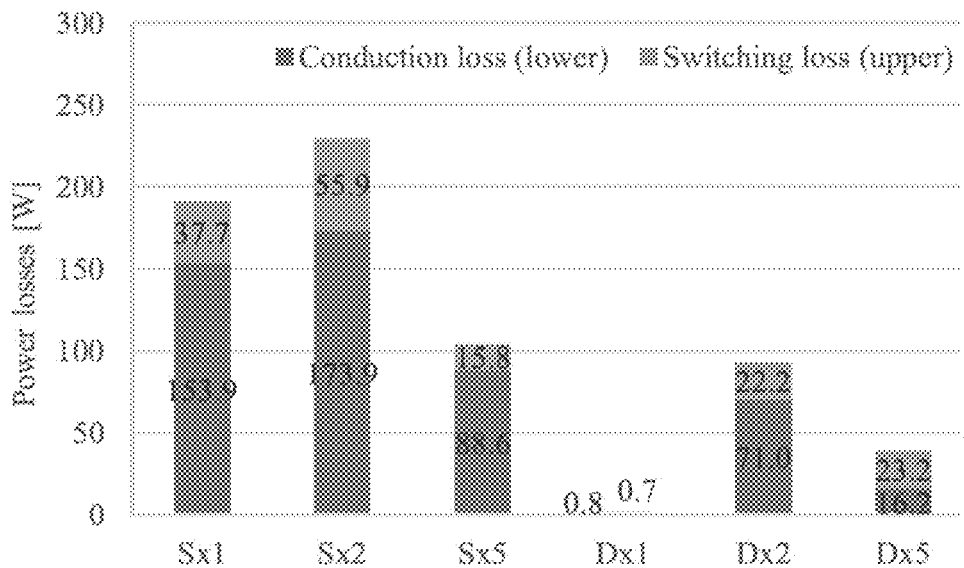

As discussed above, the active NPC (ANPC) converter has been proposed as a solution to overcome the loss imbalance problem of the NPC converter [3]. A recent study proposed an adaptive doubled frequency PWM (ADF-PWM) scheme for an improved power loss distribution compared with conventional modulation methods [5]. FIG. 7C shows the loss distribution for half the switches in one phase of an ANPC converter using the ADF-PWM scheme presented in [5]. Comparing FIG. 7A with FIG. 7C shows a better loss balancing performance of the embodiment relative to the ANPC with ADF-PWM scheme.

TABLE 2

Losses of NPC switching devices using a modulation scheme according to an embodiment described herein.

| Device | | Conduction losses (W) | Switching losses (W) | Total losses (W) |
| --- | --- | --- | --- | --- |
| Outer switch | Sa1 | 160.2 | 12.4 | 172.6 |
| | Da1 | 19.2 | 2.9 | 22.1 |
| Inner switch | Sa2 | 190.6 | 14.5 | 205.1 |
| | Da2 | 19.2 | 0.4 | 19.6 |
| Neutral diode | Da5 | 13.2 | 2.3 | 15.5 |
| All | | 402.4 | 32.5 | 434.9 |

Efficiency = 94.6%

TABLE 3

Losses of NPC switching devices using the conventional SVM technique

| Device | | Conduction losses (W) | Switching losses (W) | Total losses (W) |
| --- | --- | --- | --- | --- |
| Outer switch | Sa1 | 115.4 | 15.7 | 131.1 |
| | Da1 | 1.1 | 0.3 | 1.4 |

TABLE 3-continued

Losses of NPC switching devices using the conventional SVM technique

| Device | | Conduction losses (W) | Switching losses (W) | Total losses (W) |
| --- | --- | --- | --- | --- |
| Inner switch | Sa2 | 214.2 | 4.1 | 218.3 |
| | Da2 | 1.1 | 0.3 | 1.4 |
| Neutral diode | Da5 | 52.9 | 3.1 | 56 |
| All | | 384.7 | 23.5 | 408.2 |

Efficiency = 94.9%

Junction Temperature Variation

Figure 8:
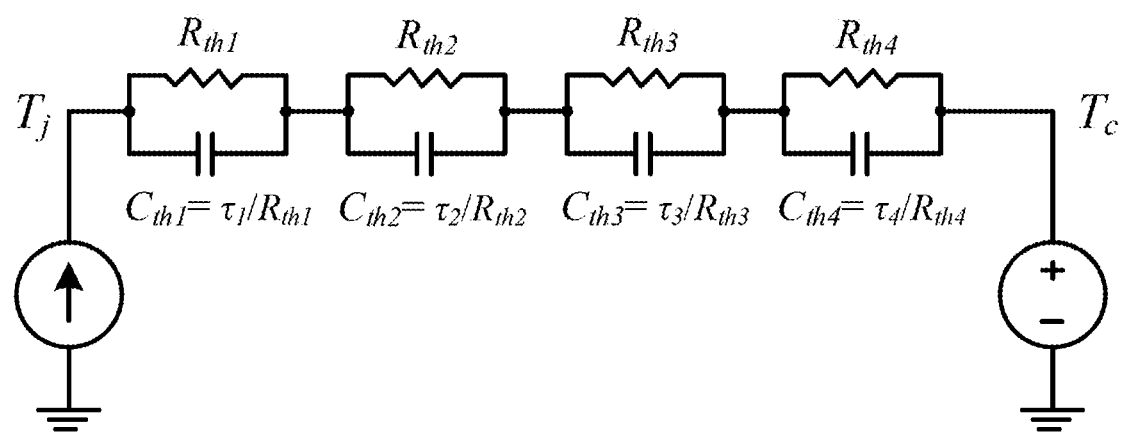
FIG. 8 is a schematic diagram of an equivalent thermal model used to analyze junction temperature of devices of converters.

The instantaneous power loss of each power device obtained from the simulations was analyzed using the thermal model shown in FIG. 8 to estimate the junction temperature Tj of each device. The case temperature (Tc) was set to 80° C. The device parameters are shown in Table 4. In FIG. 8 and Table 4, $R_{th1}$~$R_{th4}$ represent the equivalent resistances to form the transient thermal impedance of the device and $\tau_1$~$\tau_4$ are the corresponding thermal time constants.

TABLE 4

Parameters of the thermal impedance for IGBTs and diodes

| Parameter (IGBT) | Value (IGBT) | Parameter (Diode) | Value (Diode) |
| --- | --- | --- | --- |
| $R_{th1}$ | 0.0033 K/W | $R_{th1}$ | 0.01008 K/W |
| $R_{th2}$ | 0.015217 K/W | $R_{th2}$ | 0.03808 K/W |
| $R_{th3}$ | 0.070217 K/W | $R_{th3}$ | 0.10064 K/W |
| $R_{th4}$ | 0.01045 K/W | $R_{th4}$ | 0.0112 K/W |
| $\tau_1$ | 0.0008 s | $\tau_1$ | 0.0008 s |
| $\tau_2$ | 0.013 s | $\tau_2$ | 0.013 s |
| $\tau_3$ | 0.05 s | $\tau_3$ | 0.05 s |
| $\tau_4$ | 0.6 s | $\tau_4$ | 0.6 s |

Figure 9A:
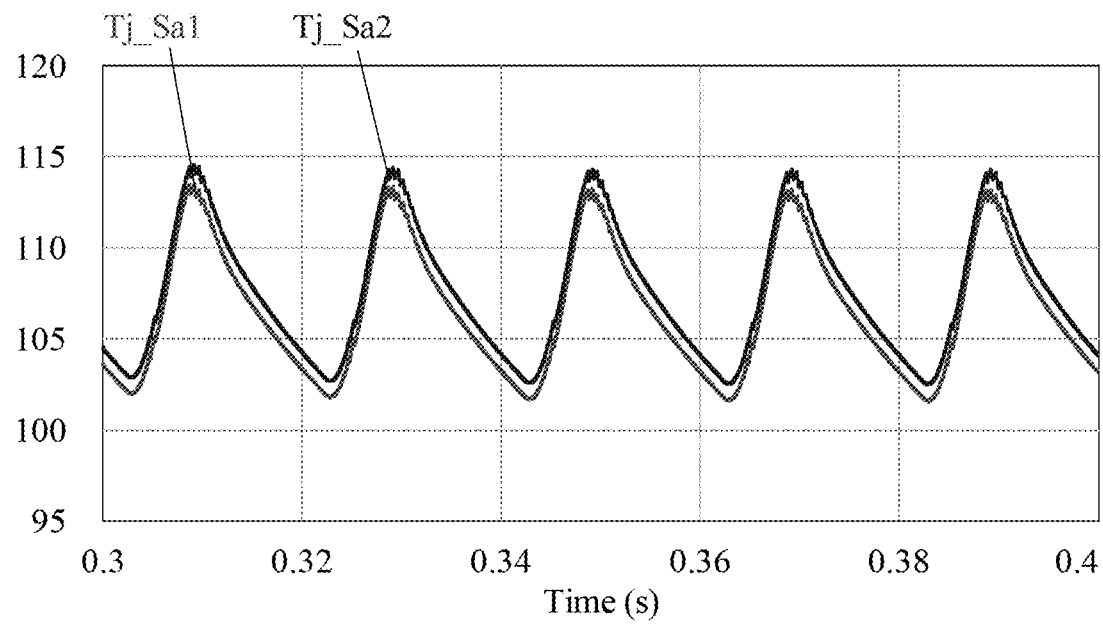
FIGS. 9A and 9B are plots showing simulation results of junction temperature of switches $S_{a1}$ and $S_{a2}$ at an operating point of M=1 and PF=0.8 for an embodiment and for a classic SVM technique, respectively.
Figure 9B:
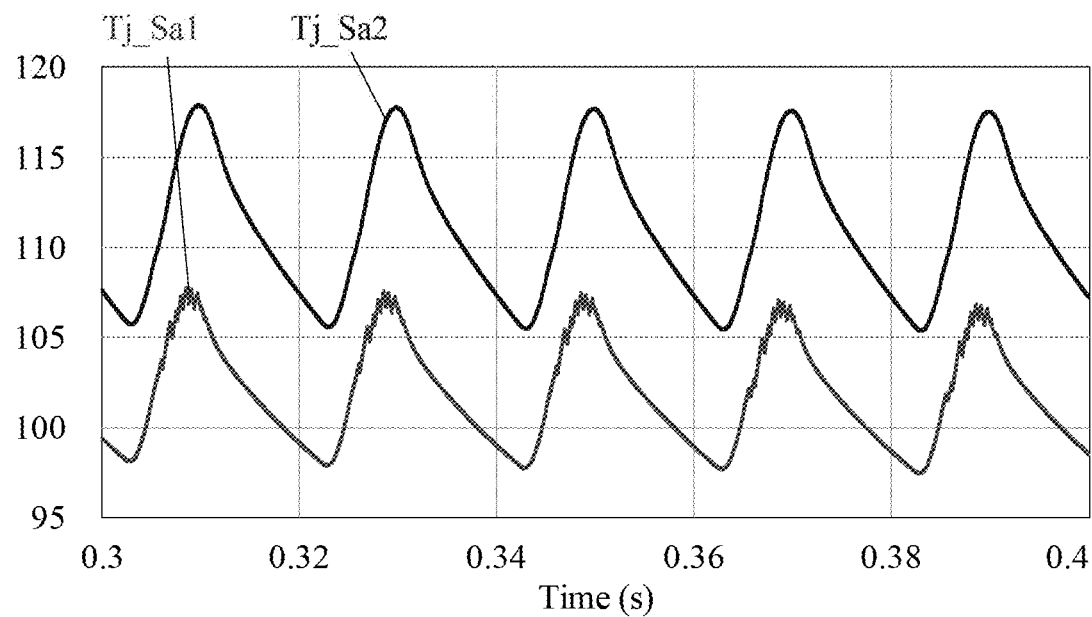
Figure 10A:
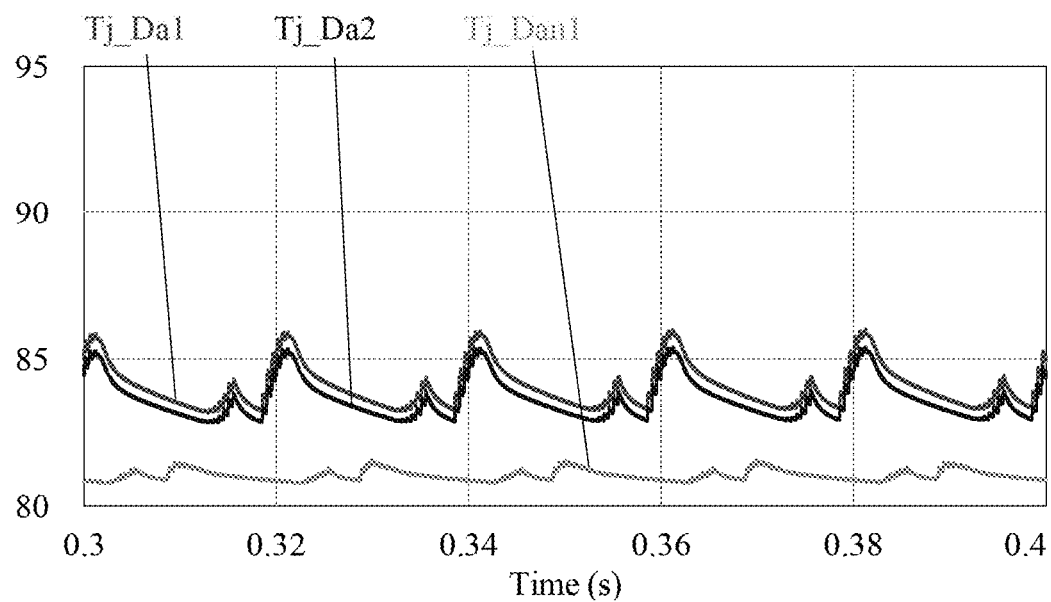
FIGS. 10A and 10B are plots showing simulation results of junction temperature of body diodes $D_{a1}$ and $D_{a2}$ and diode $D_{an1}$ at an operating point of M=1 and PF=0.8 for an embodiment and for a classic SVM technique, respectively.
Figure 10B:
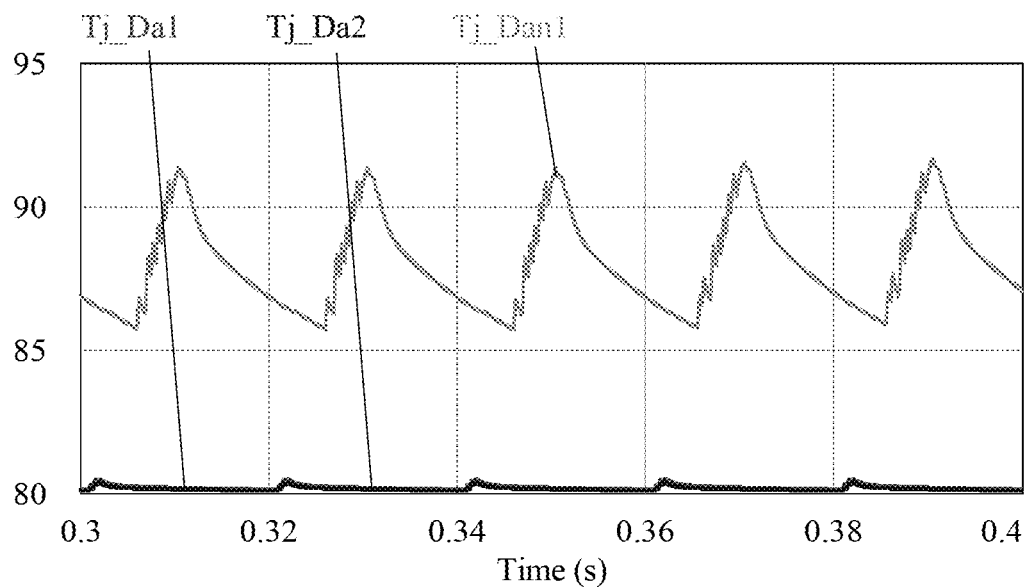

Instantaneous junction temperatures of the devices $S_{a1}$ and $S_{a2}$ and diode $D_{a5}$ were investigated under three different operating points (M=1, PF=0.8; M=1, PF=0.5; and M=0.2, PF=0.5), for the embodiment and the conventional SVM modulation scheme. In each case, the junction temperatures of $S_{a1}$ and $S_{a2}$ were almost identical for the embodiment. In contrast, the junction temperatures of $S_{a1}$ and $S_{a2}$ were different, particularly at high modulation index (M=1) for the conventional SVM technique. The junction temperature of $D_{an1}$ was substantially lower for the embodiment under all three operating points. Representative plots for M=1 and PF=0.8 are shown for $S_{a1}$ and $S_{a2}$ in FIGS. 9A and 9B (embodiment and classic SVM technique, respectively) and for body diodes $D_{a1}$ and $D_{a2}$ and diode $D_{an1}$ in FIGS. 10A and 10B (embodiment and classic SVM technique, respectively).

All cited publications are incorporated herein by reference in their entirety.

EQUIVALENTS

It will be appreciated that modifications may be made to the embodiments described herein without departing from the scope of the invention. Accordingly, the invention should not be limited by the specific embodiments set forth, but should be given the broadest interpretation consistent with the teachings of the description as a whole.

REFERENCES

[1] T. Bruckner and S. Bernet, "Loss balancing in three-level voltage source inverters applying active NPC switches," in Proc. IEEE Power Electron. Spec. Conf., June 2001, pp. 1135-1140.
[2] K. Ma, M. Liserre, and F. Blaabjerg, "Operating and loading conditions of a three-level neutral-point-clamped wind power converter under various grid faults," IEEE Trans. Ind. Appl., vol. 48, no. 2, pp. 708-719, March/April 2012.
[3] T. Bruckner, S. Bernet, and H. Guldner, "The active NPC converter and its loss-balancing control," IEEE Trans. Ind. Electron., vol. 52, no. 3, pp. 855-868, June 2005.
[4] T. Bruckner and D. G. Holmes, "Optimal pulse-width modulation for three-level inverters," IEEE Trans. Power Electron., vol. 20, no. 1, pp. 82-89, January 2005.
[5] Y. Deng, J. Li, K. H. Shin, T. Viitanen, M. Saeedifard and R. G. Harley, "Improved Modulation Scheme for Loss Balancing of Three-Level Active NPC Converters," IEEE Transactions on Power Electronics, vol. 32, no. 4, pp. 2521-2532, April 2017.
[6] S. Bhattacharya, D. Mascarella, and G. Joos, "Space-Vector-Based Generalized Discontinuous Pulse width Modulation for Three-Level Inverters Operating at Lower Modulation Indices," IEEE J. Emerging Sel. Topic Power Electron., vol. 5, no. 2, pp. 912-924, June 2017.
[7] K. Ma and F. Blaabjerg, "Modulation methods for neutral-point-clamped wind power converter achieving loss and thermal redistribution under low-voltage ride-through," IEEE Trans. Ind. Electron., vol. 61, no. 2, pp. 835-845, February 2014.
[8] K. Ma and F. Blaabjerg, "Modulation Methods for Three-Level Neutral-Point-Clamped Inverter Achieving Stress Redistribution Under Moderate Modulation Index," IEEE Trans. Ind. Electron., vol. 31, no. 1, pp. 5-9, January 2016.

The invention claimed is:

1. A method for controlling a three phase neutral point clamped (NPC) converter, comprising:
for first, second, and third phases of the NPC converter, independently controlling switching devices of each phase to produce a reconstructed output voltage level of each phase based on a linear combination of three voltage levels of that phase;
setting duty ratios of the switching devices of each phase to provide the reconstructed voltage level of each phase during a switching cycle;
wherein the three voltage levels of each phase are 0, $$\frac{Vdc}{2},$$

and Vdc, where Vdc is an NPC converter input voltage.

2. The method of claim 1, further comprising arranging the duty ratios of the switching devices of the first, second, and third phases in the switching cycle to optimize a switching frequency of the NPC converter.

3. The method of claim 1, wherein a neutral point current is minimized over one switching cycle.

4. The method of claim 1, wherein setting duty ratios comprises selecting switching states corresponding to the duty ratios associated with each space vector for each phase; wherein a switching frequency of the NPC converter is minimized.

5. The method of claim 4, further comprising balancing DC-link capacitor voltage by arranging the duty ratios of different switching states in one switching cycle such that capacitor voltage drift is compensated;
wherein volt-second balance is maintained in each phase; and
a sum of duty ratios in each phase is equal to 1.

6. A controller for a three phase neutral point clamped (NPC) converter, comprising:
a circuit that produces drive signals for power switching devices of first, second, and third phases of the NPC converter;
wherein the drive signals independently control the switching devices of each phase to produce a reconstructed output voltage level of each phase based on a linear combination of three voltage levels of that phase;
wherein the drive signals set duty ratios of the switching devices of each phase to provide the reconstructed voltage level of each phase during a switching cycle;
wherein the three voltage levels of each phase are 0, Vdc/2, and Vdc, where Vdc is an NPC converter input voltage.

7. The controller of claim 6, wherein the drive signals arrange the duty ratios of the switching devices of the first, second, and third phases in the switching cycle to optimize a switching frequency of the NPC converter.

8. The controller of claim 6, wherein the drive signals control the power switching devices to minimize a neutral point current over one switching cycle.

9. The controller of claim 6, wherein the drive signals arrange the duty ratios by selecting switching states corresponding to the duty ratios associated with each space vector for each phase;
wherein a switching frequency of the NPC converter is minimized.

10. The controller of claim 9, wherein the drive signals arrange balance DC-link capacitor voltage by arranging the duty ratios of different switching states in one switching cycle such that capacitor voltage drift is compensated;
wherein volt-second balance is maintained in each phase; and
a sum of duty ratios in each phase is equal to 1.

11. A three phase NPC converter comprising the controller of claim 6.

12. Non-transitory computer readable media for use with a processor, the computer readable media having stored thereon instructions that when executed by the processor of a controller for a three phase NPC converter, cause the controller to perform a modulation method, comprising:
for first, second, and third phases of the NPC converter, independently controlling switching devices of each phase to produce a reconstructed output voltage level of each phase based on a linear combination of three voltage levels of that phase;
setting duty ratios of the switching devices of each phase to provide the reconstructed voltage level of each phase during a switching cycle;
wherein the three voltage levels of each phase are 0, Vdc/2, and Vdc, where Vdc is an NPC converter input voltage.

13. The non-transitory computer readable media of claim 12, wherein the modulation method further comprises arranging the duty ratios of the switching devices of the first, second, and third phases in the switching cycle to optimize a switching frequency of the NPC converter.

14. The non-transitory computer readable media of claim 12, wherein a neutral point current is minimized over one switching cycle.

15. The non-transitory computer readable media of claim 12, wherein setting duty ratios comprises selecting switching states corresponding to the duty ratios associated with each space vector for each phase;
   wherein a switching frequency of the NPC converter is minimized.

16. The non-transitory computer readable media of claim 15, wherein the modulation method further comprises balancing DC-link capacitor voltage by arranging the duty ratios of different switching states in one switching cycle such that capacitor voltage drift is compensated;
   wherein volt-second balance is maintained in each phase; and
   a sum of duty ratios in each phase is equal to 1.

17. A controller for a three phase neutral point clamped (NPC) converter comprising the non-transitory computer readable media of claim 12.

* * * * *